US006173224B1

(12) United States Patent
Riesner et al.

(10) Patent No.: US 6,173,224 B1
(45) Date of Patent: Jan. 9, 2001

(54) OCCUPANT-RESTRAINT DEPLOYMENT METHOD AND SYSTEM FOR AUTOMOTIVE VEHICLE

(75) Inventors: Miloslav Riesner, Dearborn Heights; Robert D. Barnard, Lake Orion, both of MI (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/118,189

(22) Filed: Jul. 17, 1998

(51) Int. Cl.$^7$ .............................. B60R 21/32; B60R 21/01
(52) U.S. Cl. ................................. 701/47; 280/735
(58) Field of Search ................................. 701/45, 46, 47; 280/734, 735; 307/9.1, 10.1

(56) References Cited

U.S. PATENT DOCUMENTS

| | | |
|---|---|---|
| 4,994,972 | 2/1991 | Diller . |
| 5,040,118 | 8/1991 | Diller . |
| 5,073,860 * | 12/1991 | Blackburn et al. ..................... 701/47 |
| 5,216,607 | 6/1993 | Diller et al. . |
| 5,337,238 | 8/1994 | Gioutsos et al. . |
| 5,339,242 | 8/1994 | Reid et al. . |
| 5,345,402 * | 9/1994 | Gioutsos et al. ..................... 364/578 |
| 5,394,326 | 2/1995 | Liu . |
| 5,436,838 | 7/1995 | Miyamori . |
| 5,483,449 | 1/1996 | Caruso et al. . |
| 5,490,069 | 2/1996 | Gioutsos et al. . |
| 5,508,918 | 4/1996 | Gioutsos . |
| 5,718,451 | 2/1998 | White . |

OTHER PUBLICATIONS

Mahmud et al.; A new decision making algorithm for airbag control; IEEE–Vehicular Tech, vol. 44, iss. 3; Aug. 1995; pp. 690–697.*
Alrabady et al.; Development of a decision making algorithm for airbag control; IEEE–Instrumentation and Measurement Tech, May 1993; pp. 81–84.*
Gioutsos; Signal processing for automotive applications; IEEE–Accoustics, Speech, & Signal Processing, May 1995; vol. 5, pp. 2975–2978.*

* cited by examiner

Primary Examiner—Michael J. Zanelli
(74) Attorney, Agent, or Firm—David B. Kelley

(57) ABSTRACT

An occupant-restraint deployment system and method for an automotive vehicle measures an initial vehicle velocity and a vehicle acceleration over a discrete time interval and calculates a vehicle velocity. An energy-momentum (e-m) waveform is determined for the time interval based upon the vehicle velocity and a vehicle mass. A semimetric distance is calculated between the e-m waveform and each of a set of signature waveforms characterizing collision classes. Identification of a collision class is then made based upon the semimetric distances, and deployment of an occupant restraint is activated if the identified collision class indicates a collision for which deployment is appropriate.

18 Claims, 2 Drawing Sheets

OCCUPANT-RESTRAINT DEPLOYMENT METHOD AND SYSTEM FOR AUTOMOTIVE VEHICLE

FIELD OF THE INVENTION

The present invention relates to automotive vehicle occupant restraints in general, and more specifically to a method and apparatus for deploying an inflatable occupant restraint.

BACKGROUND OF THE INVENTION

It is common to use inflatable occupant restraints, sometimes referred to as airbags, in an automotive vehicle. The deployment of such devices is typically accomplished using a method that determines whether and when operation is appropriate. Currently, there are two prominent methods for deploying an airbag. One relies on jerk, the rate of change of acceleration of a vehicle colliding with another object. This method initiates deployment if and only if it determines that the magnitude of the observed jerk exceeds a prescribed magnitude. The other relies on a collision library, a collection of waveforms that represent simulated accelerations of a vehicle colliding with other objects under different configurations. This method initiates deployment if and only if it determines that the observed waveform correlates favorably with a library acceleration for which deployment is appropriate. As specified, however, both methods have shortcomings. The first relies exclusively on jerk, ignoring both absolute kinetic energy and absolute linear momentum with respect to the ground, or earth. For example, it can deploy inappropriately when jerk is large but changes in energy or momentum are small, conditions that hold for elastic, nearly elastic, and curb collisions at low speeds for which deployment is normally inappropriate. The second relies exclusively on acceleration, also ignoring both energy and linear momentum. For example, it cannot distinguish the difference between identically configured two-body collisions with the same relative velocity but with different energies and momenta. Although the relative velocity and vehicular damage are the same, the energies and momenta provide a way to distinguish the different configurations with respect to the ground. Because the two-body configurations have different ground speeds, they experience different air, road, and control conditions during collisions. Thus, they might require different strategies for deployment. Besides the defects already cited, both methods fail to account for statistical variations in observed data, especially variations inherent in all vehicular collisions.

SUMMARY OF THE INVENTION

The present invention overcomes the aforementioned disadvantages by providing a more general and effective method using energy, momentum, and statistical inference, to deploy an occupant restraint. An on-board implementation using microprocessors is also disclosed. The method for occupant-restraint deployment of the present invention rests on four basic notions: energy-momentum (e-m) waveforms, collision classes, signature waveforms, and semimetric distances between e-m waveforms. First, an e-m waveform is a two-dimensional, vector-valued function of which the first and second components represent an energy waveform and a momentum waveform, respectively. These components derive from both the acceleration and the initial velocity measured on the vehicle during a collision. Second, a collision class is the set of observable (statistically possible) e-m waveforms that could result from a specified type of collision, a class for which deployment is either appropriate or inappropriate, but not both. Third, a signature waveform is the mathematical expectation (average) of all the observable e-m waveforms of a collision class. It represents an e-m waveform best characterizing the class. And fourth, a semimetric distance between two e-m waveforms is an assigned nonnegative, nondimentional number quantifying the difference between these two objects.

The occupant-restraint deployment method of the present invention comprises the steps of measuring an initial vehicle velocity and a vehicle acceleration sample for a discreet time interval, calculating a vehicle velocity from the initial vehicle velocity and the vehicle acceleration, determining an e-m waveform for the time interval based upon the vehicle velocity and a vehicle mass, calculating a semimetric distance between the e-m waveform and each of a set of signature waveforms characterizing a collision class, identifying a collision class based upon the semimetric distances, and activating the deployment of an occupant restraint if the identified collision class indicates a collision for which deployment is appropriate.

The method is preferably implemented in computer code on a vehicle occupant-restraint controller having a microprocessor with parallel processing capabilities. The occupant-restraint system has an occupant restraint, such as an airbag, and a controller, as described above, connected to an occupant-restraint activation module.

An advantage of the present invention is an occupant-restraint deployment method and a system that accurately determines collisions for which deployment of an occupant restraint is appropriate.

A feature of the present invention is a method using energy, momentum, and statistical inference to deploy an occupant restraint.

BRIEF DESCRIPTION OF THE DRAWINGS

These and other objects, advantages, and features of the present invention will be apparent to those skilled in the art upon reading the following description with reference to the accompanying drawings, in which.

DETAILED DESCRIPTION OF THE PREFERRED EMBODIMENT

Figure 1:
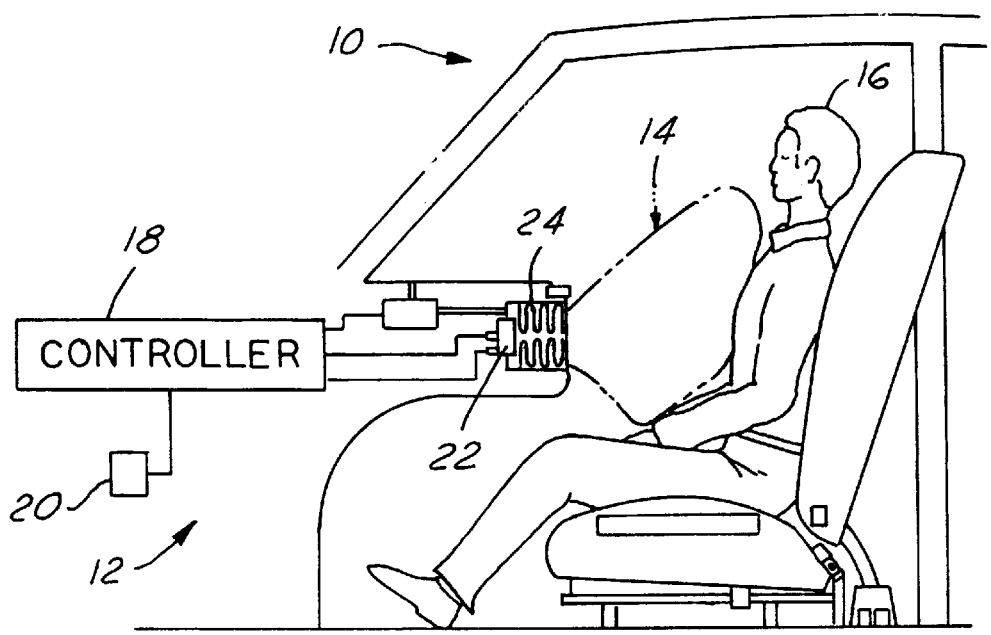
FIG. 1 is a side view of an automotive vehicle having an occupant-restraint system according to the present invention therein.

Turning now to the drawings, and in particular to FIG. 1 thereof, an automotive vehicle, shown generally at 10, has an occupant-restraint system, shown generally at 12, for deploying an occupant restraint 14 to restrain a vehicle passenger 16 under predetermined circumstances, as further described below. The occupant-restraint system 12 has a controller 18 which receives signals from sensing devices 20 representing vehicle acceleration and an initial vehicle velocity, among other vehicle conditions. The sensing devices 20 can be accelerometers, for example, and the controller 18 preferably has a microprocessor capable of parallel processing. An occupant-restraint activation module 22 deploys the occupant-restraint 14, typically an inflatable airbag, when a signal to deploy is received from the controller 18. As is known in the art, the occupant restraint 14 is contained in a housing 24 prior to deployment.

The occupant-restraint deployment method of the present invention is primarily based on four factors: energy-momentum (e-m) waveforms, collision classes, signature waveforms, and semimetric distances between e-m waveforms. First, an e-m waveform is a two-dimensional, vector-valued function of which the first and second components represent an absolute-energy waveform and an absolute-momentum waveform, respectively. These components derive from both the acceleration and the initial velocity measured on the vehicle during a collision. Second, a collision class is the set of observable (statistically possible) e-m waveforms that could result from a specified type of collision, a class for which deployment is either appropriate or inappropriate, but not both. Third, a signature waveform is the mathematical expectation (average) of all the observable e-m waveforms of a collision class. It represents an e-m waveform best characterizing the class. And fourth, a semimetric distance between two e-m waveforms is an assigned nonnegative, nondimentional number quantifying the difference between these two objects.

Figure 2A:
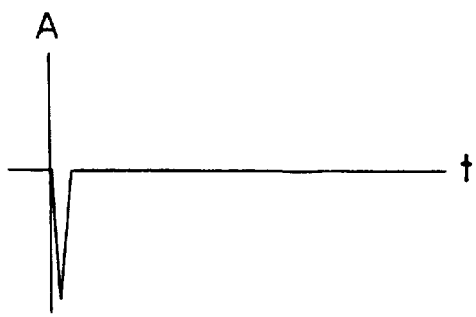
FIGS. 2a–2d are graphs showing waveforms representing vehicle acceleration, energy, and momentum.
Figure 2D:
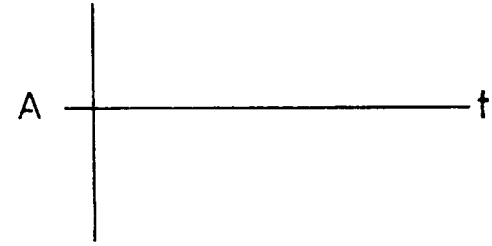
Figure 2B:
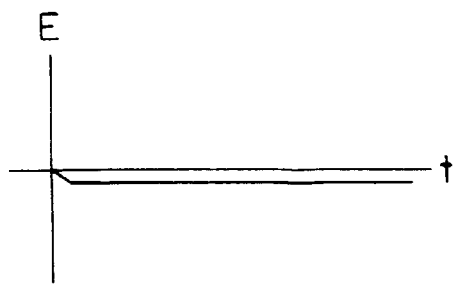
Figure 2C:
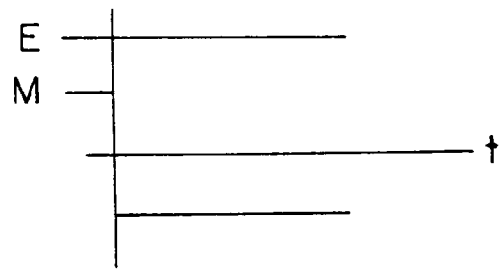

The rational for using both energy and momentum is illustrated by the collision waveforms in FIGS. 2a–2d. In the FIGS. 2a and 2b. waveforms A and E represent, respectively, the acceleration and energy corresponding to a vehicle running into and over a curb at low speed, an event for which deployment is normally inappropriate. The maximum magnitude of the jerk over the time interval is relatively large, and the magnitude of the change of energy is relatively small. Therefore, under jerk, the collision would result in deployment. But under energy, it would not. In FIGS. 2c and 2d, waveforms A, M, and E, represent, respectively, the acceleration, energy, and momentum corresponding to a vehicle bouncing elastically off another object at an arbitrary speed. The change of energy is zero at any speed, the jump in momentum is proportional to speed, the acceleration is an impulse, and the jerk (the derivative of the impulse) is heuristically an infinite doublet. Therefore, under energy, collisions at different speeds are mutually indistinguishable. But under momentum, all are distinguishable. Under jerk, however, they are mutually indistinguishable, and deployment is always requisite. These examples and others strongly indicate that energy and momentum changes are more significant than either jerk or acceleration alone.

Figure 3A:
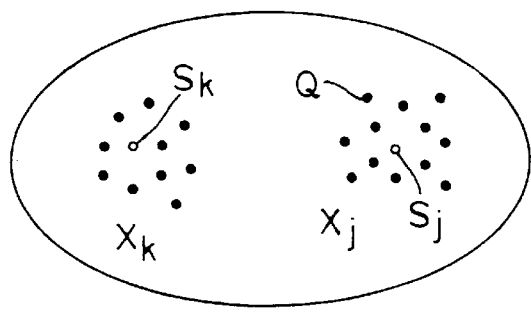
FIGS. 3a–3b are schematic diagrams representing observed, observable, and signature e-m waveforms in a semimetric space.
Figure 3B:

One aspect of the method of the present invention is illustrated by the schematic diagrams in FIGS. 3a and 3b. Elements q, $x_j$, $s_j$, and $s_k$ in 3a denote an observed e-m waveform, an observable e-m waveform, the signature waveform of class j, and the signature waveform of any other class k, respectively. By this geometry, q is identified with class j if and only if the distance between q and $s_j$ is smaller than the distance between q and $s_k$. That is, the method identifies class j with the collision underway if and only if it determines that q is closest to $s_j$, as shown in 3b. Larger distances between signature waveforms and smaller overlaps between classes yield smaller probabilities of identification errors. Conversely, smaller distances and larger overlaps yield larger probabilities. These separation properties provide guidelines for insuring the robustness, or effectiveness, of the method.

Although there are many possible definitions of the semimetric distance between two e-m waveforms, a definition is used that is believed to be most effective. Specifically, the semimetric distance is defined to be the sum of the magnitudes of the differences in the changes of their energy components and momentum components over a specified time interval.

COLLISION FORMULATION

E-M waveforms, collision classes, signature waveforms, and semimetric distances are used to model and identify collision behavior in the present invention. These are discussed serially as follows.

1. E-M Waveforms

An e-m waveform q is defined by the vector expression $$q:=(q_e,q_m)\in L_\infty[0,T]\times L_\infty[0,T],$$

where $q_e$ and $q_m$ denote respectively the absolute kinetic energy and absolute linear momentum components given by $$q_e:=\tfrac{1}{2}Mv^2$$

$$q_m:=Mv,$$

where M and $L_\infty[0,T]$ denote respectively the mass of the vehicle and the linear space of essentially bounded, real-valued functions on the bounded time interval [0,T], and denotes the absolute linear velocity given by $$v(t):=\int_0^t a(\tau)d\tau+v(0)$$

in terms of the acceleration a and the initial velocity v(0).

2. Collision Classes

Next, collision classes are associated with random functions. More explicitly, if Q is a specified collision class of observable e-m waveforms in $L_\infty[0,T]\times L_\infty[0,T]$, then Q is identical to the vector-valued random function x given by $$x:=\{q|q\in Q\},$$

and x(t) is a vector-valued random variable at t∈[0,T] given by $$x(t):=\{q(t)|q\in Q\},$$

where the standard symbol {z|P(z)} denotes the set of all elements z satisfying the condition P(z). For purposes of this disclosure, the expressions random functions and deterministic refer specifically to random e-m waveforms and nonrandom e-m waveforms, respectively.

3. Signature Waveforms

Next, a signature waveform is defined for a collision class to be the unique nonrandom waveform that best characterizes all the observable e-m waveforms in the class. More explicitly, if $x_j$ is a specified random waveform for a collision class j, then the signature $s_j$ relative to class j is given formally by $$s_j(t) := E[x_j(t)]$$

and approximately by $$s_j(t) := \frac{1}{p_j} \sum_{i=1}^{p_j} q_{ji}(t),$$

where E is the expectation operator, $q_{ji}$ is the $i^{th}$ observed e-m waveform in class j from a series of test collisions, and $p_j$ is the total number of observed e-m waveforms in class j.

4. Semimetric Distances

Finally, a semimetric distance between any two e-m waveforms is defined to be the sum of the magnitudes of the differences in the changes of their energy components and momentum components over interval [0,T]. That is, if $x_1$, $x_2$ are specified e-m waveforms, either random or nonrandom, then the distance between $x_1$ and $x_2$ is given by $$\rho(x_1, x_2) := E\left[ \sum_{a=e,m} |[x_{1a}(T) - x_{1a}(0)] - [x_{2a}(T) - x_{2a}(0)]| \right],$$

where $x_1$ and $x_2$ are regarded as equivalent (not necessarily identical) if $\rho(x_1,x_2)=0$. Unlike standard semimetrics, this semimetric relates directly to the physical energies and momenta associated with collisions. Moreover, because energy and momentum features in acceleration waveforms prove to be more significant than other features, they provide a more effective basis for correlating observed e-m waveforms with collision classes.

CLASS IDENTIFICATION

To identify an observed e-m waveform in a collision with one collision class among several, a method based on semimetric distances is used. The method determines the smallest distance between the observed e-m waveform and all the signature waveforms. Under this strategy, the method identifies the observed e-m waveform with a particular class if and only if this smallest distance corresponds to the distance between the observed e-m waveform and the signature waveform of the class. More explicitly, let the classes j (j=1, . . . , n) be the defined classes, let $s_j$ be the signature waveform of class j, let the waveform q be an observed e-m waveform, and let the distances between the signature waveforms satisfy the condition $$\rho(s_j,s_k) > 0, \; k \neq j.$$

If for some class j, $$\rho(q,s_j) < \rho(q,s_k), \; k \neq j, \qquad (1)$$

then q identifies with class j.

It should be noted that if q is actually in class j and if $$\rho(x_j,s_j) < \rho(x_j,s_k), \; k \neq j,$$

then inequality (1) and the correct identification are exrpected. In applying this method, as in a microprocessor-based occupant-restraint deployment system of the present invention, note that with only a single observation, the distance between q and $s_j$ could be equal to or larger than one of the other distances. Thus, the probability of identification errors could be nonzero. This probability decreases if the distances between signature waveforms increase and the overlaps between classes decrease. Because of this separation principle, the robustness of the identification method may be measured by the parameter $$R := \min_{k \neq j} \frac{\rho(s_j, s_k)}{\rho(x_j, s_j) + \rho(x_k, s_k)}.$$

Clearly, increasing R increases the separation and, hence, decreases the probability of identification errors. Consequently, this parameter can be useful in defining collision classes that lead to smaller probabilities.

There are four distinct functions of this system in a collision over the time interval [0,T]. The first is measuring the initial velocity v(0) and the acceleration samples $a(n \cdot T_s)$, where $T_s$=the sample period, n=0, 1, 2 . . . N, and $N \cdot T_s \leq T$. The second is retrieving from the signature library the signature samples $s_j(n \cdot T_s)$, $n \geq 0$. The third is calculating the velocity samples $$v(T_s) = a(0) \cdot T_s + v(0)$$

$$v(n \cdot T_s) = a((n-1) \cdot T_s) \cdot T_s + v((n-1) \cdot T_s), \; n \geq 1,$$

the observed e-m waveform samples $$q(n \cdot T_s) = (q_e(n \cdot T_s), q_m(n \cdot T_s)), \; n \geq 0,$$

and the semimetric distances $$\rho_n(q, s_j) = \sum_{a=e,m} |[q_a(n \cdot T_s) - q_a(0)] - [s_{ja}(n \cdot T) - s_{ja}(0)]| \qquad (2)$$

between q and $s_j$ over the intervals $[0, n \cdot T_s]$, $n \geq 0$. And the fourth is applying criterion (1) and distances (2) to generate a sequence of tentatively identified collision classes converging to the actual collision class, an adaptive procedure that insures the quickest class identification possible.

For all $n \geq 0$, the method of the present invention performs all measurements, retrievals, calculations, and tentative identifications within the time interval $[n \cdot T_s, (n+1) \cdot T_s]$. In a preferred embodiment, parallel processing techniques are employed to perform the aforementioned functions.

Figure 4:
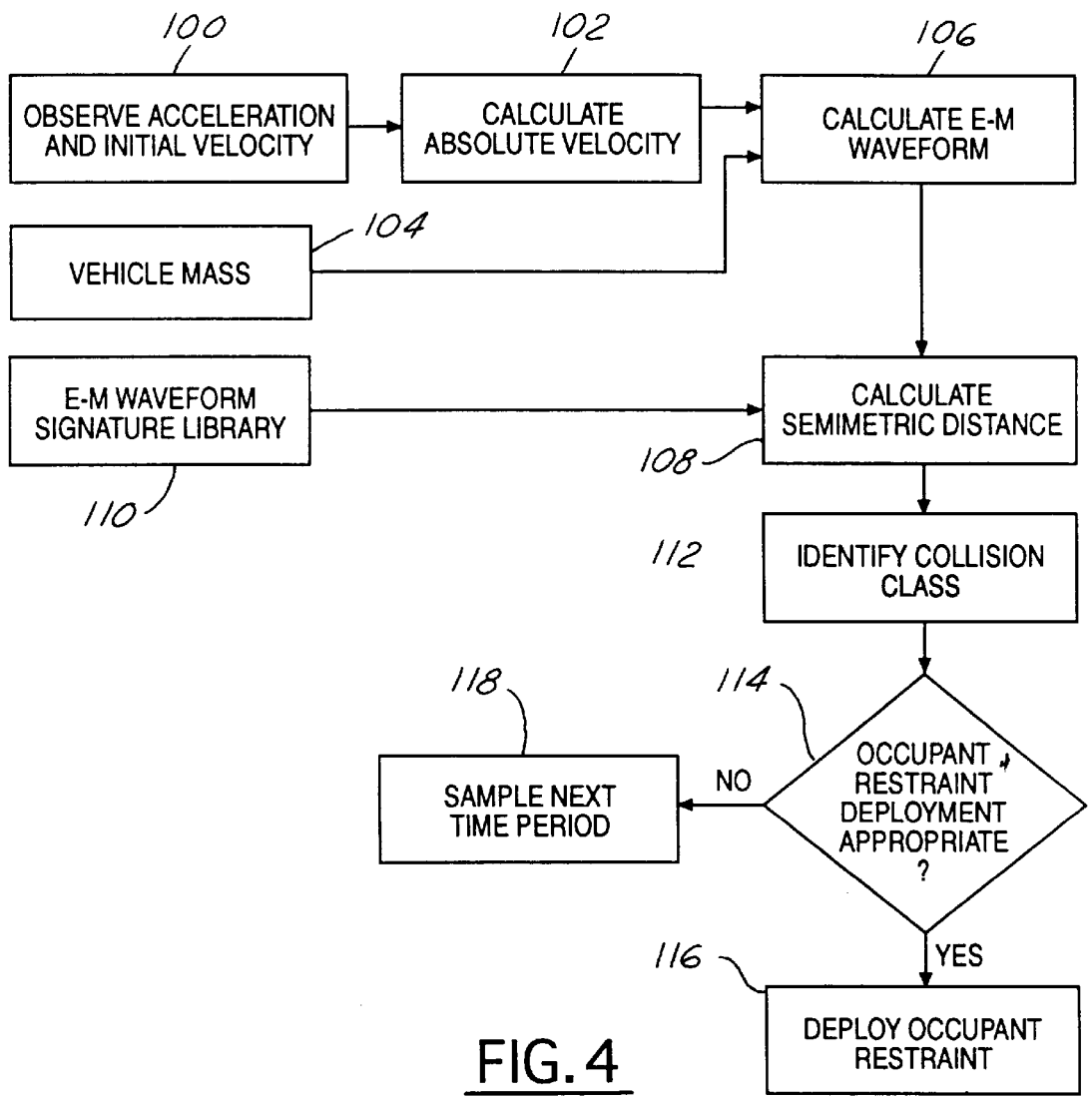
FIG. 4 is a flowchart showing a method of occupant-restraint deployment according to the present invention.

Referring now to FIG. 4, a flowchart showing one embodiment of the method of the present invention is shown. Beginning in box 100, an acceleration and an initial velocity are observed, for example through use of the sensing devices 20 previously discussed. These signals are sent to the controller 18 (FIG. 1), and an absolute velocity is calculated (box 102) based on the acceleration and initial velocity according to the above equations. The absolute velocity is then used, along with the vehicle mass (box 104), to calculate an e-m waveform (box 106), which, as previously discussed, is a vector expression having two components, an energy component and a momentum component. A semimetric distance is then calculated (box 108) using equation (2) above between the calculated e-m waveform and each signature waveform in a signature waveform library (box 110). The semimetric distances are then used, as described above, to identify a collision class (box 112). Each collision class is either a "deploy" class or "no deploy" class, so that a decision can be made in diamond 114 whether deployment of the occupant restraint is appropriate. If the collision class identified in box 112 is a "deploy" class, then a deploy signal is sent from the controller 18 to the occupant-restraint activation module 22 and the occupant restraint 14 is deployed. If, however, the collision class identified in box 112 is a "no deploy" class, then a deploy signal is not sent to the occupant-restraint activation module 22 and processing in the microprocessor of controller 18 returns for the next time interval (box 118).

Although the preferred embodiments of the present invention has been disclosed, various changes and modifications may be made without departing from the scope of the invention as set forth in the appended claims.

What is claimed is:

1. An occupant-restraint deployment method for an automotive vehicle, the method comprising the steps of:
   determining an e-m waveform for a discrete time interval;
   retrieving a set of collision signature waveforms from a collision signature library;
   calculating a semimetric distance for the discrete time interval between the e-m waveform and each of a set of signature waveforms characterizing a collision class;
   generating a sequence of tentatively identified collision classes based upon the semimetric distance;
   identifying an actual collision class as the limit of the sequence of tentatively identified collision classes; and
   activating deployment of an occupant restraint if the actual collision class indicates a collision for which deployment is appropriate.

2. The method of claim 1 wherein the e-m waveform is a two-dimensional, vector-valued function of which the first and second components represent an energy waveform and a momentum waveform, respectively.

3. The method of claim 2 including the steps of measuring an initial vehicle velocity and a vehicle acceleration and calculating a vehicle energy and vehicle momentum based thereon.

4. The method of claim 1 wherein the sequence of tentatively identified collision classes is a set of observable e-m waveforms that could result from a specified type of collision, a class for which deployment is either appropriate or inappropriate, but not both.

5. The method of claim 1 wherein a collision signature waveform is an expectation of all the observable e-m waveforms of a collision class that represents an e-m waveform characterizing the class.

6. The method of claim 1 wherein the semimetric distance is calculated as an assigned nonnegative, nondimentional number quantifying the difference between the e-m waveform and one of the set of collision signature waveforms.

7. The method of claim 1 wherein the step of activating the occupant restraint is accomplished by sending a signal from a controller to an occupant-restraint activation module.

8. An occupant-restraint deployment method for an automotive vehicle, the method comprising the steps of:
   measuring an initial vehicle velocity and a vehicle acceleration sample for a discrete time interval;
   calculating a vehicle velocity from the initial vehicle velocity and the vehicle acceleration;
   determining an e-m waveform for the time interval based upon the vehicle velocity and a vehicle mass;
   calculating a semimetric distance between the e-m waveform and each of a set of signature waveforms characterizing, a collision class;
   identifying a collision class based upon the semimetric distances; and
   activating deployment of an occupant restraint if the identified collision class indicates a collision for which deployment is appropriate.

9. The method of claim 8 wherein the vehicle velocity is calculated as $$v(T_s) = a(0) \cdot T_s + v(0)$$

$$v(n \cdot T_s) = a((n-1) \cdot T_s) \cdot T_s + v((n-1) \cdot T_s), n \geq 1,$$

where v(0) is the initial measured velocity and a (n·$T_s$) are the acceleration samples where $T_s$=the sample period, n=0, 1, 2 ... N, and N·$T_s \leq$ T.

10. The method of claim 9 wherein the e-m waveform is calculated as $$q(n \cdot T_s) = (q_e(n \cdot T_s), q_m(n \cdot T_s)), n \geq 0,$$

$$q_e := \tfrac{1}{2} M v^2$$

$$q_m := M v,$$

where M=vehicle mass, and v=vehicle velocity.

11. The method of claim 10 wherein the semimetric distances between q and $s_j$ over the intervals [0,n·$T_s$], n$\geq$0, and $s_j$(n·$T_s$), n$\geq$0 are determined as $$\rho_n(q, s_j) = \sum_{a=e,m} |[q_a(n \cdot T_s) - q_a(0)] - [s_{ja}(n \cdot T_s) - s_{ja}(0)]|$$

where q and s are an observed e-m waveform and a signature waveform, respectively.

12. The method of claim 11 wherein the collision class is identified if for some class j, $$\rho(q, s_j) < \rho(q, s_k), k \neq j,$$

then q identifies with class j, where j(j=1, ..., n) are defined collision classes, $s_j$ is the signature waveform of class j, and q is an observed e-m waveform.

13. The method of claim 8 wherein the step of activating the occupant restraint is accomplished by sending a signal from a controller to an occupant-restraint activation module.

14. An occupant-restraint deployment system for an automotive vehicle comprising:
   means for measuring an initial vehicle velocity and vehicle acceleration;
   an occupant-restraint activation module adapted for activation of a vehicle deployable occupant restraint; and
   deployment control means for causing the occupant-restraint activation module to activate deployment of the deployable occupant restraint if an actual collision class indicates a collision for which deployment is appropriate based on a set of e-m waveforms, a set of collision classes, a set of signature waveforms each of which represents one of the set of collision classes, and a set of semimetric distances between the e-m waveforms and each of the set of signature waveforms.

15. The system according to claim 14 wherein the deployment control means has velocity code means associated therewith for determining a vehicle velocity as $$v(T_s)=a(0){\cdot}T_s+v(0)$$

$$v(n{\cdot}T_s)=a((n-1){\cdot}T_s){\cdot}T_s+v((n-1){\cdot}T_s), n\geq 1;$$

where $v(0)$ is the initial measured velocity, $a(n{\cdot}T_s)$ are the acceleration samples, $T_s$=the sample period, $n=0, 1, 2 \ldots N$, and $N{\cdot}T_s \leq T$.

16. The system of claim 15 wherein the deployment control means has e-m waveform code means associated therewith for determining an e-m waveform as $$q(n{\cdot}T_s)=(q_e(n{\cdot}T_s), q_m(n{\cdot}T_s)), n\geq 0,$$

where $$q_e:=\tfrac{1}{2}Mv^2$$

$$q_m:=Mv;$$

M=vehicle mass, and v=vehicle velocity.

17. The system of claim 16 wherein the deployment control means has semimetric code means associated therewith for determining a set of semimetric distances between $q$ and $s_j$ over the intervals $[0, n{\cdot}T_s]$, $n\geq 0$, and $s_j(T_s)$, $n\geq 0$ as $$\rho_n(q, s_j) = \sum_{a=e,m} |[q_a(n{\cdot}T_s) - q_a(0)] - [s_{ja}(n{\cdot}T_s) - s_{ja}(0)]|$$

where q and s are an observed wave form and a signature waveform, respectively.

18. The system of claim 17 wherein the deployment control means has collision class identification code means associated therewith for identifying a collision class if for some class j, $$\rho(q,s_j)<\rho(q,s_k), k\neq j,$$

then q identifies with class j, where $j(j=1, \ldots, n)$ are defined collision classes, $s_j$ is the signature waveform of class j, and q is an observed e-m waveform.

* * * * *